(No Model.) 3 Sheets—Sheet 1.
C. LUYERS.
AERO-ELECTRIC AUTOMATIC BRAKE.
No. 563,934. Patented July 14, 1896.
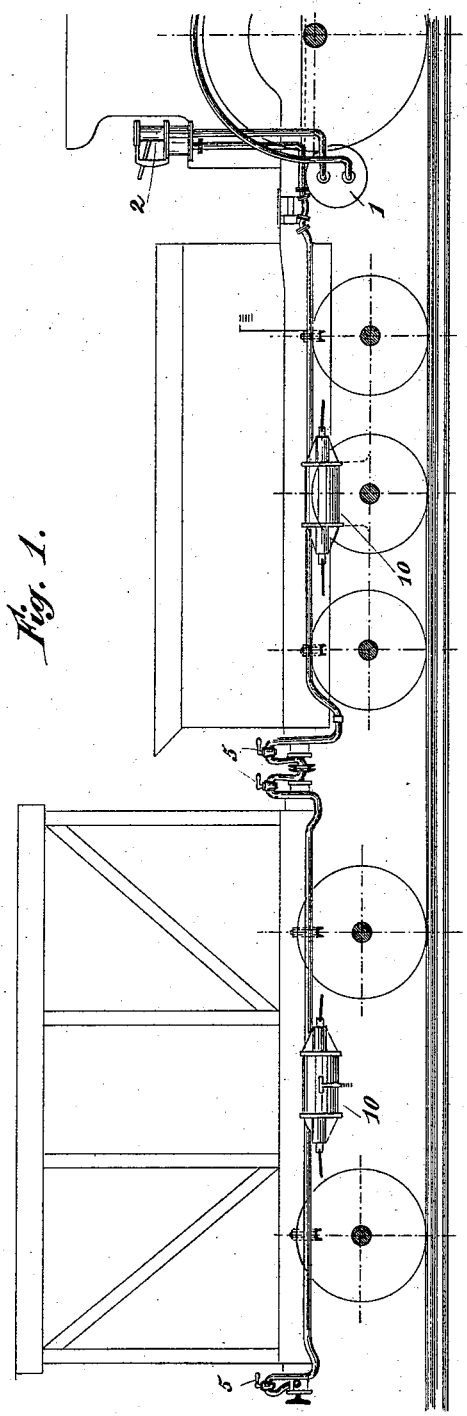
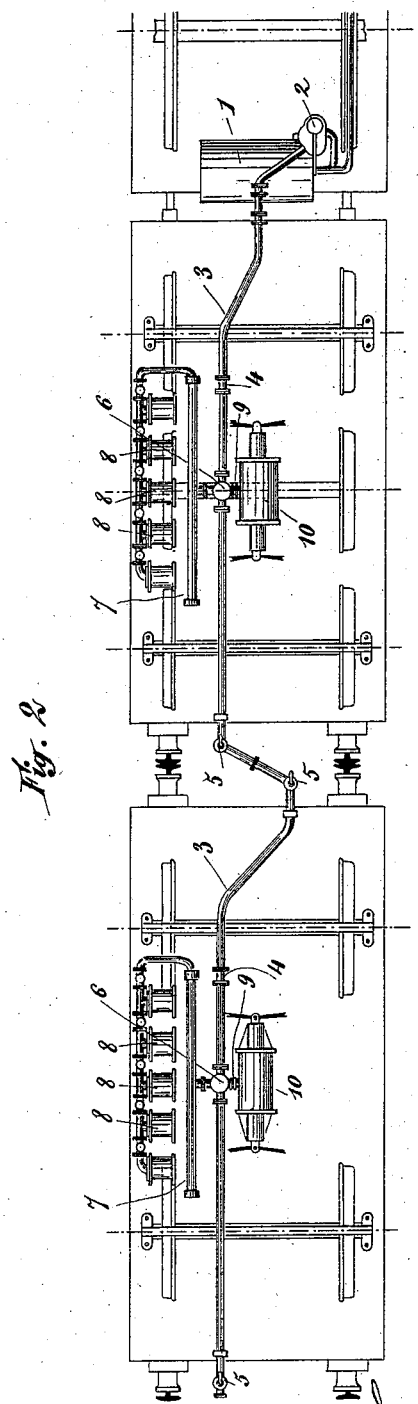
Witnesses.
H. van Oldeneel
E. A. Scott.
Inventor
Charles Luyers
by
Attorneys (No Model.) 3 Sheets—Sheet 2.
C. LUYERS.
AERO-ELECTRIC AUTOMATIC BRAKE.
No. 563,934. Patented July 14, 1896.
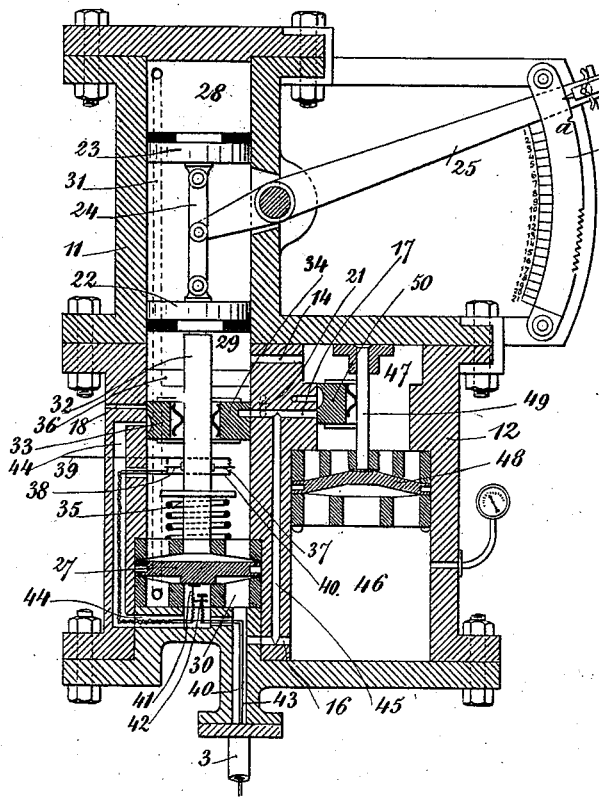
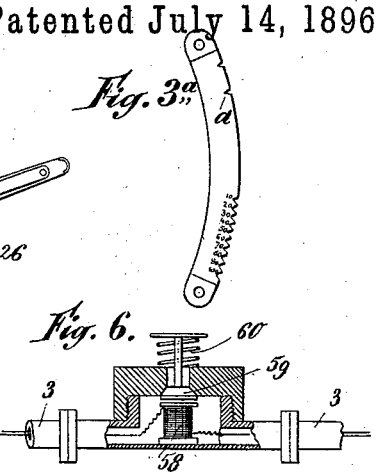
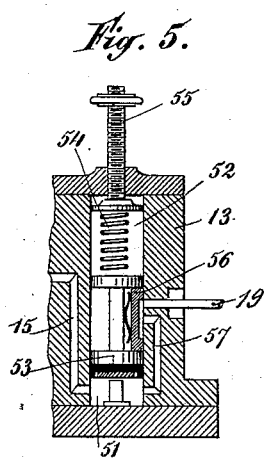
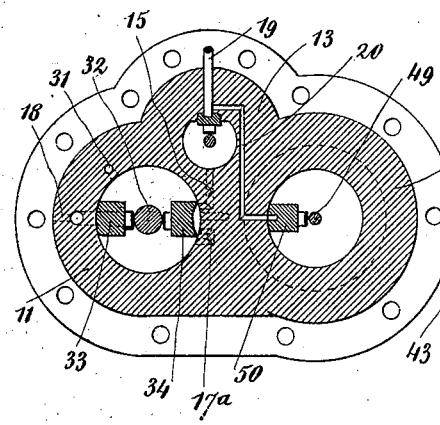
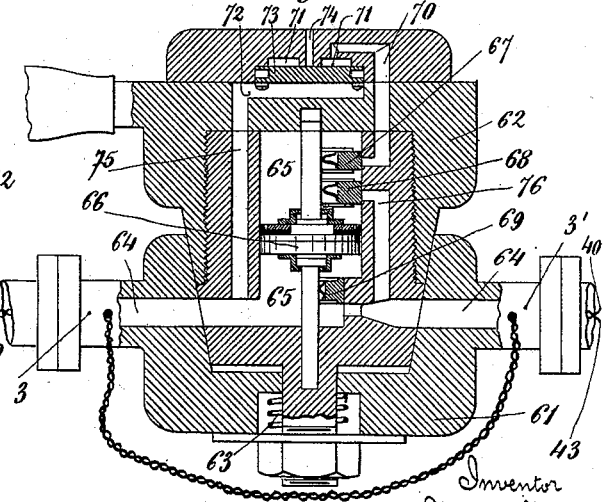
Witnesses
H. van Oldenneel
E. A. Scott
Inventor
Charles Luyers
by
Attorneys (No Model.) 3 Sheets—Sheet 3.
C. LUYERS.
AERO-ELECTRIC AUTOMATIC BRAKE.
No. 563,934. Patented July 14, 1896.
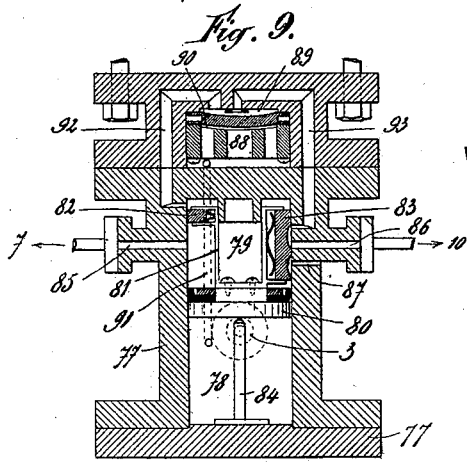
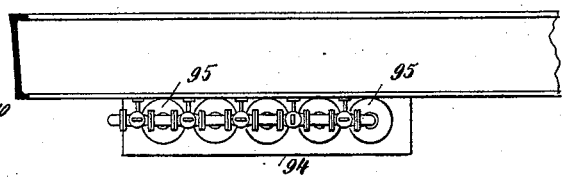
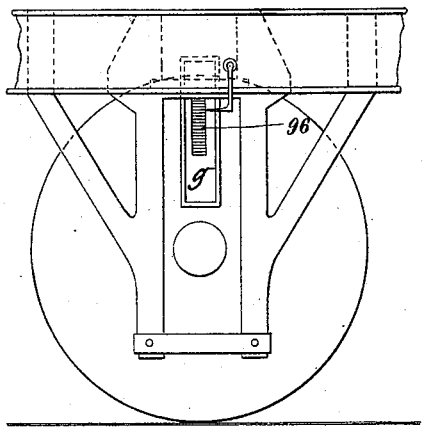
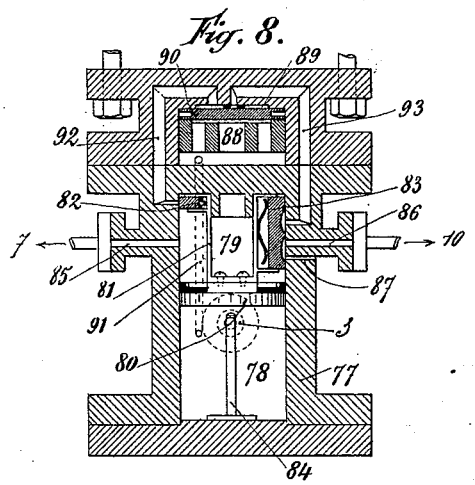
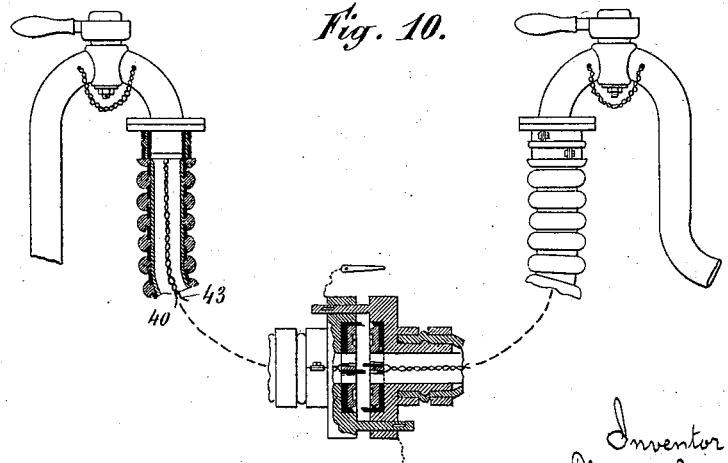
Witnesses
H. van Oldenneel
E. A. Scott
Inventor
Charles Luyers
by
Attorneys
THE NORRIS PETERS CO., PHOTO-LITHO., WASHINGTON, D. C.

United States Patent Office.

CHARLES LUYERS, OF BRUSSELS, BELGIUM.

AERO-ELECTRIC AUTOMATIC BRAKE.

SPECIFICATION forming part of Letters Patent No. 563,934, dated July 14, 1896.

Application filed September 29, 1894. Serial No. 524,525. (No model.) Patented in Belgium March 14, 1894, No. 108,996, and September 13, 1894, No. 85,342; in France September 10, 1894, No. 228,221, and in England September 13, 1894, No. 19,453.

*To all whom it may concern:*

Be it known that I, CHARLES LUYERS, a subject of the King of the Belgians, residing at 11 Paul Devaux Street, in the city of Brussels, in the Kingdom of Belgium, have invented certain new and useful Improvements in Electric Air-Brakes for Goods-Trains, of which the following is a specification.

The invention has been patented in Belgium March 14, 1894, No. 108,996, and September 13, 1894, No. 85,342; in France September 10, 1894, No. 228,221, and in England September 13, 1894, No. 19,453.

The object of this invention is an air-brake for goods-trains intended to be operated by electric apparatus, but which will also work automatically through air-pressure if any accident should prevent the electric devices from acting, or if such electric devices should not be used at all. With the help of such braking apparatus the engine-driver is enabled to regulate the pressure of the brake-shoes against the wheel-tires or against friction-drums, especially adapted to the axles for that purpose, in such a way that said pressure shall be proportional, as well to the invariable dead-weight, increased by the variable load of the train, as to the variable coefficient of friction, due to the pressure of the shoes on the tires or the drums, and to the speed of the train, and also to the variable coefficient of adhesion of the wheels to the rails, the whole being done automatically, without any mental exertion or responsibility for the engine-driver.

The system adopted in the present invention for feeding with compressed air the brake-cylinders when the brakes are to be applied is the one in which the air-reservoirs and the train-pipe connecting all the vehicles of a train are kept continually under pressure, the brakes being applied by lessening the pressure in the train-pipe at the proper moment. In order that the principle upon which I have based my invention may be better understood, before going into the details of the drawings and showing the way in which the different parts of the apparatus work together I shall point out which part the different factors play in the braking action.

If we call Q the pressure of the brake-shoes on the wheel-tires or the drums, P the dead-weight of the vehicle increased by the momentary load, $f'$ the coefficient of friction of the shoes on the tires or the drums, and $f^3$ the coefficient of adhesion of the wheels to the rails, in order always to insure the greatest efficiency at any moment of the braking action, the delaying force F must be $F = Q f'$, coming very near but not reaching $P f^3$. Hence the limit of useful value to be given to Q is found through the equation $Q = P \dfrac{f^3}{f'}$ if the shoes press on the wheel-tires, and $Q = P \dfrac{f^3}{f'} 3$ for a drum of one-third the diameter of the wheels, or $Q = P \dfrac{f^3}{f'} 4$ for a drum of one-fourth the diameter of the wheels. In these equations $f'$ is the only factor which is affected by the braking mechanism, and it varies in an inverse proportion to the speed of the pressed surface. As to $f^3$, it is constant during the braking action, but it varies according to the state of the wheels and rails, and also to the hygrometric condition of the atmosphere, or any other cause through which the wheels and rails might be more or less wet. The apparatus hereinafter described enables the engine-driver to take this latter factor into consideration. In order, therefore, that Q may be usefully employed, all variations of $f'$ are reduced to one single and invariable value during the braking action by means of special brake-drums acted on by shoes suspended from a fixed point, described by me in the specification of Letters Patent No. 537,984, dated April 23, 1895, and which are supposed to be used in combination with the present invention. To overcome the difficulties which the variations of P and $f^3$ offer in forming Q, apparatus is used such as is hereinafter described with reference to the drawings.

Figure 1 is schematic elevation of the after part of an engine with the tender and one

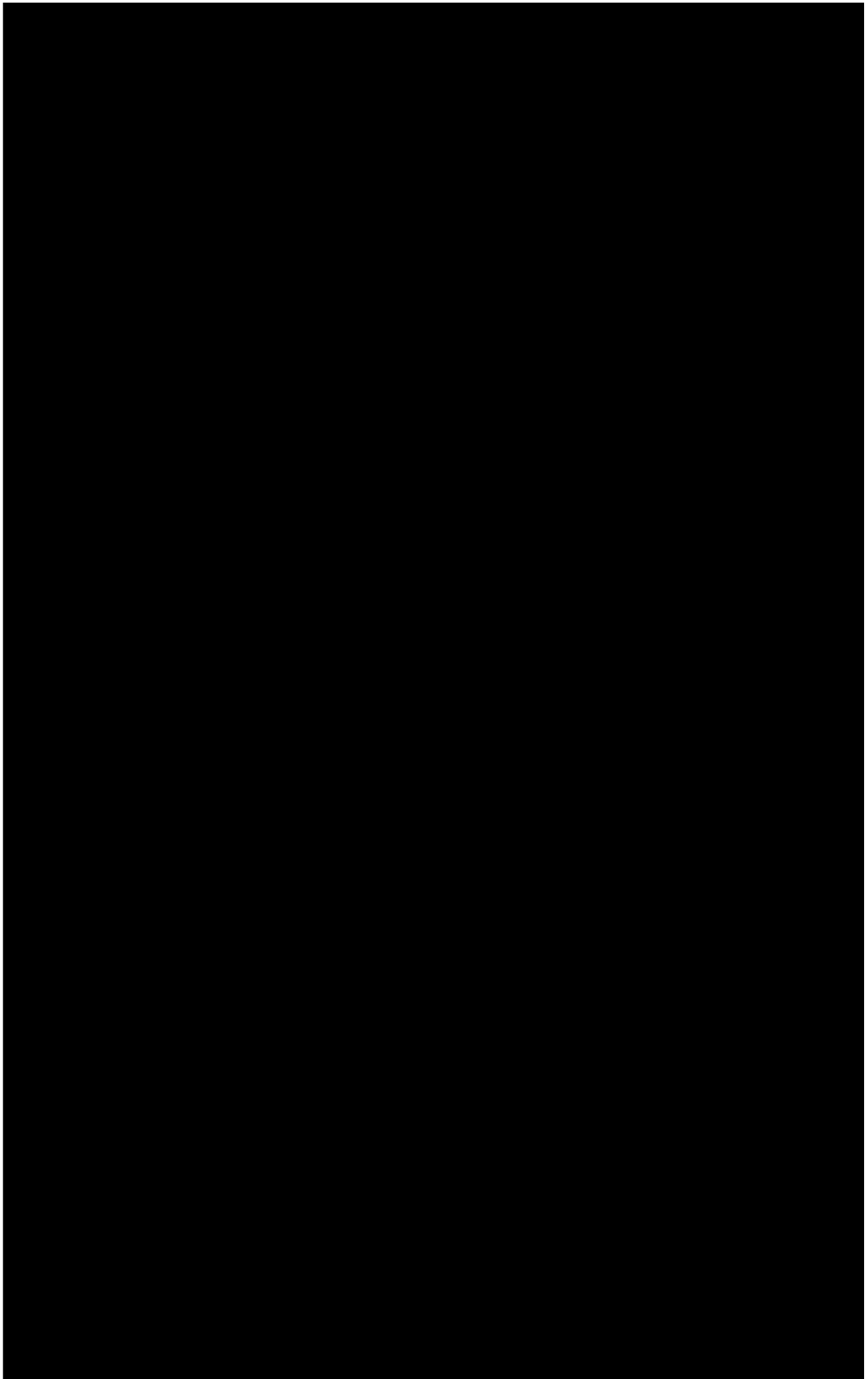

Another inner passage 45 connects the passages 16 and 17.

The cylinder 12 is divided into two chambers 46 and 47 by a diaphragm 48, carrying a rod 49, to which is attached a slide-valve 50. The cylinder 13, which, as has been said, communicates with the main reservoir by passage 19, is divided into two chambers 51 and 52 by means of a piston 53, which is pressed down by a helical spring 54, the tension of which may be regulated to the required limit by means of a screw 55. A slide-valve 56 is fixed to the rod of the piston, this slide-valve covering the end of the passage 19 and the upper end of a passage 57, the lower end of which enters the chamber 51, out of which leads the passage 15 before mentioned.

The difficulties offered by the factor $f^3$ (adhesion of the wheels to the rails) are overcome by substituting the scale shown in Fig. 3ª, when the rails are wet or when the adhesion is less from some other cause, to the one numbered 26 in Fig. 3, which is used under ordinary circumstances.

It is evident that the greater the speed of the train, or the smaller the coefficient of adhesion, the greater the pressure must be on the brake-drums or wheel-tires to insure action, and therefore the more compressed air must be admitted into the brake-cylinders. Now by the construction of my driver's valve and other devices, the relative operation of which shall be shown hereinafter, the greater the depression in the train-pipe the greater will be the quantity of compressed air admitted into the brake-cylinders, and the greater the pressure will be on the brake-drums or the wheel-tires. The driver's valve so affects the train-pipe that the lower the lever 25 is pushed down the greater the depression will be in the train-pipe. This being understood, I can explain the use of the two scales shown in 26 and Fig. 3ª. The line of numbers to the left of scale 26 shows the quantity of liters of free air admitted into the brake-cylinders, (the whole capacity generally being twenty-one liters condensed into the space of seven liters under a pressure of three atmospheres,) and it serves to establish and control the scale to the right, which corresponds to the various possible speeds of the train, from ten to one hundred kilometers. If the scale of kilometers, Fig. 3ª, is put on instead of the scale shown in 26, the quantity of free air admitted into the brake-cylinders for braking the train at a certain speed, the coefficient of adhesion being low, will be the same as the quantity admitted for a much higher speed with the scale shown at 26 put on, as will be easily seen by comparing the two scales.

Fig. 6 shows a relief-valve of a very simple construction, the working of which will be easily understood by looking at the figure. The armature of the magnet 58 carries the valve 59, which is held on its seat by a spring 60. When the electric current passes through the magnet, the armature is attracted, and the valve is open, putting the train-pipe or the brake-cylinder, as the case may be, in communication with the outer air.

Referring to Fig. 7, 61 is the shell of a cut-off cock, which is placed at each end of the train-pipe under each vehicle. 62 is the body of the cock, held down in its seat by a spring 63. A passage 64 is bored through this body, so that the different sections of the train-pipe may communicate with each other when the cock is open. In the center of the body this passage 64 is widened out to form a cylindrical cavity 65. In this cavity is a piston 66, on the rod of which are fixed two slide-valves 67 and 68 above the piston, and another slide-valve 69 below the same. When the piston 66 is up, as shown in Fig. 7, the slide-valve 69 uncovers the entrance to 3', which is the continuation of the train-pipe 3, the slide-valve 67 covering the lower extremity of a passage 70, the upper end of which communicates into the upper part of a space divided into two chambers 71 and 72 by a diaphragm 73, which, when at rest, covers a passage 74, leading from 71 into the outer air, the chamber 72 being connected with the train-pipe 3 by a passage 75. The slide-valve 68 at the same time covers the upper end of a passage 76, the lower end of which communicates with 3'. The piston 66 is provided with a cupped leather, the edge of which is turned up, so as to allow compressed air entering above the piston without the piston being effected, but to force the piston down if the pressure under it should become less than the pressure above. Moreover, the piston is not fixed on its rod, but is held thereon only by friction, so that the piston may be capable of a little fall without taking the rod and slide-valves along with it, if only a little difference of pressure between the two sides of the piston should occur, the use of which arrangement shall be hereinafter explained. The communication between the different sections of the train-pipe 3 and 3' being at times cut off, either through the cock being turned or by the passage being obstructed by the slide-valve 69, the electric wires 40 and 43 are led around below the outside of the cock.

Referring to Figs. 8 and 9, which show the automatic valve placed at the crossing of the train-pipe and of the branch pipe leading from the auxiliary reservoir to the brake-cylinder, 77 is the casing of a cylinder, the lower part 78 of which is in direct communication with the train-pipe 3, the upper space 79 being separated from this lower space by a piston 80, provided with a cupped leather, the edge of which is turned upward, the piston, instead of a rod, having a perforated tube 81, to one side of which is fixed a single slide-valve 82, and to the other side a double slide-valve 83. A peg 84 prevents the piston from coming down so far as to cover the entrances to the train-pipe 3. A passage 85 leads out of the chamber 79 to the auxiliary reservoir 7, and another passage 86 leads to the brake-cylinder 10. A small passage 87 connects this same chamber 79 with the outer air. Above the chamber 79 is an empty space, divided into two chambers 88 and 89 by a diaphragm 90. The chamber 88 communicates with the chamber 78 by a passage 91, while the chamber 89 communicates with the chamber 79 by two passages 92 and 93, the lower end of 92 being shut by the slide-valve 82 when the piston 80 is in its highest position, and the lower end of 93 being covered by the double slide-valve 83, so that 87 will communicate with 86, leading to the brake-cylinder, putting this cylinder in communication with the outer air. When the piston is in its lowest position, as shown in Fig. 9, the communication between 86, leading to the brake-cylinder, and 87, leading to the outer air, is cut off, while this same slide-valve 83 will establish communication between 86 (the brake-cylinder) and 93, (the passage leading to the little chamber 89.) The diaphragm 90 covers the upper end of the passage 93, so long as the pressure on its upper face is not superior to the one on its lower face.

Fig. 10 shows the coupling of the different sections of the train-pipe from one vehicle to the other and will be easily understood by an inspection of the drawings. Flexible pieces of hose depend from the extremities of the train-pipes outside of the cut-off cocks and are terminated each by a metallic disk, provided with the necessary packing and any convenient device for coupling it to the disk of the next vehicle. When coupled, the electric wires conveniently isolated in the disk will be put in contact with the wires of the next section by means of projecting points. In fact any coupling will do, so long as it is air-tight and connects the electric wires from one vehicle to the next one.

Fig. 11 shows the auxiliary reservoir, which is composed of a main body 94 and a certain number of smaller receptacles 95, all connected with each other and with the main body, but having a cock placed before the first subdivision and between each two subdivisions. The main body 94 is calculated to contain the necessary quantity of compressed air to put the brake on when the car or truck is empty, and each subdivision 95 to contain an additional quantity, corresponding to a given fraction of the loading capacity of the car or truck. These subdivisions may be multiplied at will. Let us suppose, for instance, a car with a loading capacity of ten tons subdivided in quantities of two tons each. The car, besides the main body 94 of the auxiliary reservoir, will have five smaller reservoirs 95, and, supposing this car loaded with only six tons of goods, it will be sufficient to shut the cock between the third and the fourth compartments, all the other ones being open, as shown on the drawings, to have an auxiliary reservoir, the capacity of which corresponds exactly to the weight of the car with its momentary load. The load of each car being generally determined at the station from which the train starts, and remaining the same all along the road, it is easy to give the auxiliary reservoir of each vehicle the capacity corresponding to its weight.

Fig. 12 shows an easy way of determining this weight as near as required for the above purpose. In the suspension for the brake-blocks described in Letters Patent No. 537,984 the bar $g$, having its outer ends supported by the axle-boxes, is fixed and independent of any up or down motion which the body of the vehicle makes on its springs. The more the car is loaded the more the body will go down on its springs, while the bar $g$ is motionless. A scale fixed on the outer vertical part of this bar $g$ is now made to correspond with an index fixed to the frame of the car. This will show the weight of the load and enable the cock corresponding to this weight to shut.

It is manifest from what has been said with reference to Fig. 11 that all the brake-cylinders of a train will not receive the same quantity of compressed air when the brakes are put on. The pressure on the brake-shoes of the heavier cars will be stronger than the pressure on the brake-shoes of the lighter ones. All the cars will be braked at the same time according to their weight, and no shocks between the different cars can take place. Thus the difficulties offered by the factor P in forming the pressure Q to the greatest benefit are overcome.

Having thus described the essential parts of my invention, their relative operation is as follows: I first suppose that the cock of the auxiliary reservoir of each car, corresponding to the load of the car, has been shut, as explained above with reference to Fig. 11. Now, supposing the main reservoir under full pressure, the lever 25 in the position shown in Fig. 3, and the helical spring 54 set to the pressure under which the train-pipe and the auxiliary reservoirs are to be kept, (generally four atmospheres,) compressed air will enter through 19, 56, 57, 51, 15, 21, 17, 34, and 17$^a$, filling the chamber 29, which through 14 will fill the chamber 47, and passing through 45, 16 will fill the chamber 46, the train-pipe 3, and the chambers 30 and 28, connected through 31. The electric contact between the source of electricity 39 and the conductor 41 is broken at 42 between said conductor and the conductor 43, which controls the electromagnet of the relief-valves 4. These valves are closed, while, the electric communication between 39, 37, and 40 being unbroken, the relief-valves 9, which open a communication between the brake-cylinders and the outer air, are open. The valves 4 being shut, the compressed air will continue through the whole length of the train-pipe, and, entering the automatic valves shown in Fig. 8, will fill the chambers 78, lift the pistons 80, leak through the cupped leathers of said pistons 80 into the chambers 79, and from there fill the auxiliary reservoirs through the passages 85, until the pressure having attained the limit fixed by the tension of the helical spring 54, the piston 53 will rise, taking along with it the slide-valve 56, which will obstruct the passage 57 and cut off all communication between the main reservoir and the braking apparatus, which will remain under the determined pressure as long as the equilibrium is not disturbed. The communications between the auxiliary reservoirs and the brake-cylinders are cut off, through the slide-valves 83 having the position shown in Fig. 8, the brake-cylinders communicating with the outer air as well through the open relief-valves 9 as through the passages 86 and 87.

If the lever 25 is pushed down a little, into the notch shown at $a$ on Figs. 3 and $3^a$, it is in what may be called "running order." The double piston 22 23 is raised a little, allowing the slide-valves 33 and 34 to rise under the pressure of the spring 35, so as to obstruct the passages 17 and $17^a$. If under such circumstances a leak occurs in the train-pipe or elsewhere, the pressure in said train-pipe, and consequently in the chamber 46, decreases, and the pressure in the chamber 47 remaining normal, the diaphragm 48 descends, drawing down with it the slide-valve 50, the effect of which will be to put the main reservoir in direct communication with the chamber 46 and the train-pipe, through the passages 20, 21, 17, and 45, thus compensating for the leakage, until the equilibrium is reëstablished, when the diaphragm 48 and the slide-valve 50 will rise to their former position and cut off the communication between the main reservoir and the train-pipe.

When the brakes are to be put on, the lever 25 is put on the division of scale 26 or $3^a$, as the case may be, corresponding to the speed of the train. The double piston 22 23 is now further raised, thereby increasing proportionally the capacity of the chamber 29 and of the chamber 47 connected with it. Under the effect of the spring 35 the slide-valve 33 rises till it strikes the stops 36, thereby establishing a communication between the passages 44 and 18, the latter one leading into the outer air. At the same time, a depression having taken place in the chamber 29 through the raising of the piston 22 23, the diaphragm 27 rises, establishing the electric contact between 42 and 43, thereby opening the relief-valves 4 all along the train. The contact being now broken at 37, the relief-valves 9 are shut. The passage 44 being given free by the diaphragm 27 being lifted off its entrance, the air from the train-pipe and from the chamber 30 can now escape into the outer air through the passages 44 and 18, while all along the train-pipe the air escapes through the relief-valves 4 and through the shut-off cocks shown in Fig. 7, as will be shown hereinafter, or through these cocks alone, if no electric devices are used. This state of things will continue until equilibrium is established between the chamber 29 and the chamber 30, when the diaphragm 27 will again go down and shut the passage 44. The chamber 28 is made to communicate through the passage 31 with the chamber 30, in order to have the least possible resistance on the upper surface of the piston 23, so that the necessary force for moving the lever 25 be reduced to a minimum. It will now be clear that the action of the driver's valve consists in increasing the capacity of the chamber 29, thereby establishing a communication between the train-pipe and the chamber 30 on the one hand and the outer air on the other hand. It follows that the more the lever 25 is depressed, and the more the capacity of the chamber 29 is increased thereby, the greater will the depression be in the train-pipe. I shall now explain how the depression in the train-pipe affects the automatic valves shown in Figs. 8 and 9.

A little depression in the train-pipe and in the chamber 78, such as may occur through a leakage in the train-pipe or elsewhere, will not affect the piston 80 or the auxiliary reservoir, the cupped leather occasioning a sufficient friction to keep the piston from going down, and its curved-up lip preventing the compressed air in the auxiliary reservoir from participating in the depression occasioned through the leakage; but as soon as a stronger depression occurs in the train-pipe through the opening of the passage 18 and the relief-valves 4 or the cut-off valves, or both, the piston 80 will be forced down upon the peg 84 through the pressure in the chamber 79 and the auxiliary reservoir. The piston 80 is now in the position shown on Fig. 9. The slide-valve 82 uncovers the passage 92, and the double slide-valve 83 puts the passage 93 in communication with the passage 86, leading to the brake-cylinder, while it cuts off the communication of this same passage 86 with 87, leading to the outer air. The compressed air existing in the chamber 79 and the auxiliary reservoir cannot escape through the edge of the piston 80 on account of the curved-up lip of the cupped leather, but it finds its way through 92 into the little chamber 89 and to the upper side of the diaphragm 90, and, the pressure in the chamber 88 having also been lessened on account of its communication with the chamber 78 through passage 91, the diaphragm 90 is forced down, uncovering the entrance of passage 93, and a certain quantity of the compressed air contained in the auxiliary reservoir finds its way through this passage and the passage 86 into the brake-cylinder, until the equilibrum is reëstablished between the chambers 89 and 88, or which is the same, between the auxiliary reservoir and the train-pipe. It is evident from what has been said that the greater the depression in the train-pipe the more time it will take to establish this equilibrium, the more compressed air will pass into the brake-cylinder, and the stronger the pressure will be on the wheel-tires or the brake-drums. It will also be seen that by putting the lever 25 on a division of the scale nearer to *a* than the one corresponding to the speed of the train said speed will be slackened without the train being stopped altogether.

The action of the cut-off cocks, Fig. 7, is as follows: When the train-pipe and the auxiliary reservoirs are being fed, the piston 66 will rise under the pressure, taking along with itself the slide-valves 67, 68, and 69, thereby uncovering the entrance to 3', which is the continuation of the train-pipe, and covering the entrances to the passages 70 and 76. When it can rise no farther, compressed air will leak through the cupped leather into the upper part of chamber 65, establishing the same pressure in that compartment as in the lower compartment and the train-pipe. At the same time compressed air will find its way through the passage 75 into the chamber 72, which will thus be under the same pressure as the train-pipe. If on the road a leak should occur in the train-pipe, the pressure in the part of the chamber 65, situated above the piston 66, will force this piston down, but on account of its being loose on its rod, as has been explained before, it will not take the slide-valves 67, 68, and 69 along with itself, and will only allow the compressed air in the upper part of the chamber 65 to reach the same pressure as the air in the lower part of said chamber and the train-pipe, which through the leakage can have been reduced only very little; but if the brakes are to be put on a greater depression occurs in the train-pipe, as has been explained before, and consequently in the lower part of chamber 65, and the piston 66, now leaning on the slide-valve 69, will descend further, taking along with itself the slide-valves 67, 68, and 69, the first two uncovering the entrances of the passages 70 and 76 and the last covering the entrance to 3', the continuation of the train-pipe, which will now communicate through passage 76, the upper part of chamber 65, and passage 70 with the little chamber 71. This chamber will now be under the same pressure as 3', which is the normal one, but the pressure in the chamber 72 having gone down on account of its communication with the train-pipe 3 through the passage 75, the diaphragm 73 will be depressed, thus giving free the passage 74, which leads to the outer air. Thus the compressed air contained in the section 3' of the train-pipe will escape through this passage 74 until it has reached the same limit as the air contained in the section 3, when the diaphragm 73 will rise and shut the passage 74.

It will thus be seen that, even should there be no relief-valves 4, the different sections of the train-pipe will find an opening into the outer air at the end of each vehicle. As will be easily noticed by looking at Fig. 7, the cut-off cocks must always be turned with their handles toward the engine, in order that the slide-valves may work properly. The cut-off cocks may be worked like ordinary cocks when it is required to take one or more vehicles out of the train.

What I claim is—

1. In electric air-brakes for goods-trains, the combination with the main reservoir, the train-pipe, the electric relief-valves, the automatic valves, the cut-off cocks, the auxiliary reservoirs, of a driver's valve composed of three cylinders 11, 12 and 13 communicating with each other through passages, and having inside of them a double piston 22 23, a piston 53 adjustable to different pressures, slide-valves 33, 34, 50 and 56, to obstruct the passages when required, diaphragms 27 and 48, the first carrying electric contacts to operate the relief-valves the main cylinder 11 being divided into chambers 28, 29 and 30, and the double piston 22 23 separating the chambers 28 and 29 being provided with a lever 25 corresponding with an interchangeable scale of speed, substantially as described.

2. In air-brakes for goods-trains, the combination with the main reservoir, the driver's valve, the train-pipe, the auxiliary reservoirs, the cut-off cocks, of automatic valves divided into four chambers 78, 79, 88 and 89 communicating together, with the train-pipe, with the auxiliary reservoirs, with the outer air and with the brake-cylinder, by means of passages, and having a piston 80 to separate chambers 78 and 79, slide-valves 82 and 83 in chamber 79 to obstruct the passages when required, and a diaphragm 90 separating chambers 88 and 89, and also obstructing passages when required, substantially as described.

3. In air-brakes for goods-trains, the combination with the main reservoir, the train-pipe, the driver's valve, the automatic valves, the auxiliary reservoirs, of cut-off cocks having chambers 65, 71, and 72, communicating with each other, with the train-pipe and with the outer air through passages, and having a piston 66, loose on its rod, slide-valves 67, 68, and 69 to obstruct said passages when required, and a diaphragm 73 to obstruct the opening to the outer air or give it free when required, substantially as described.

4. In air-brakes for goods-trains the combination with the main reservoir the train-pipe, the driver's valve, the automatic valves, the cut-off cocks, of auxiliary reservoirs divided into separate compartments, with cocks between these compartments, all of them communicating together and with the automatic valves, one of them corresponding to the dead-weight of the vehicle, and the others corresponding each to a certain fraction of the loading capacity of the vehicle, the momentary load being indicated by a scale fixed to the suspension-bar of the brake-shoes, and an index fixed to the frame of the vehicle, substantially as described.

In testimony whereof I have hereunto set my hand this 17th day of September, 1894.

CHARLES LUYERS.

Witnesses:
AUGUSTE DE CEMTER,
GREGORY PHELAN.